United States Patent [19]
Yamada et al.

[11] Patent Number: 5,831,704
[45] Date of Patent: Nov. 3, 1998

[54] ALIGNMENT LAYER INCLUDING ELECTRODEPOSITED LAYER FOR LIQUID CRYSTAL DISPLAY DEVICE AND METHOD FOR FABRICATING

[75] Inventors: Nobuaki Yamada, Higashiosaka; Shuichi Kozaki, Nara, both of Japan

[73] Assignee: Sharp Kabushiki Kaisha, Osaka, Japan

[21] Appl. No.: 901,997

[22] Filed: Jul. 29, 1997

[30] Foreign Application Priority Data

Jul. 30, 1996 [JP] Japan ..................................... 8-200786

[51] Int. Cl.⁶ .................................................. G02F 1/1337
[52] U.S. Cl. .......................... 349/124; 349/125; 349/129; 349/134; 349/110
[58] Field of Search ........................... 349/139, 124–125, 349/134, 138, 187, 110, 129

[56] References Cited

U.S. PATENT DOCUMENTS 5,552,911   9/1996   Okada et al. ............................ 349/106

FOREIGN PATENT DOCUMENTS 7-199193   8/1995   Japan .
7-311383   11/1995   Japan .
7-333612   12/1995   Japan .

*Primary Examiner*—William L. Sikes
*Assistant Examiner*—Kenneth Parker
*Attorney, Agent, or Firm*—Nixon & Vanderhye

[57] ABSTRACT

A substrate for a liquid crystal display device, which is used as one of a pair of substrates provided so as to face each other with a liquid crystal layer interposed therebetween. The substrate includes a plate, an electrodeposition layer formation electrode and an electrodeposition layer provided so that the electrodeposition layer formation electrode is disposed closer to the plate than the electrodeposition layer. The electrodeposition layer formation electrode includes a region having a surface conductivity lower than that of another region in each pixel region and the low surface conductivity region has a shape of at least one line. The surface of the electrodeposition layer has a concave shape having a lowermost portion at a position corresponding to the low surface conductivity region so that liquid crystal regions each having a different orientation direction of liquid crystal molecules partitioned by the low surface conductivity region are formed.

10 Claims, 9 Drawing Sheets

When no voltage is applied
(only one pixel is shown)

FIG. 3B

When gray-scale voltage is applied

Region B | Region A

Power source
(the state where
gray-scale voltage
is applied)

FIG. 3C

When saturation voltage is applied

Power source
(saturation
voltage)

(Production steps of color filter of the present invention)

FIG. 4A
Fabrication of ITO

FIG. 4B
Formation of black matrix

FIG. 4C
Electrodeposition (R,G,B)

FIG. 4D
Formation of overcoat layer

FIG. 4E
Fabrication of ITO film

ALIGNMENT LAYER INCLUDING ELECTRODEPOSITED LAYER FOR LIQUID CRYSTAL DISPLAY DEVICE AND METHOD FOR FABRICATING

BACKGROUND OF THE INVENTION

1. Field of the Invention

The present invention relates to a substrate for a liquid crystal display device (hereinafter, referred to as an LCD device) for a personal computer, a word processor, an amusement machine, a television set or the like, which is used as at least one of a pair of opposing substrates having a liquid crystal layer interposed therebetween, a method for fabricating the same, and a liquid crystal display device using the same.

2. Description of the Related Art

Figure 8:
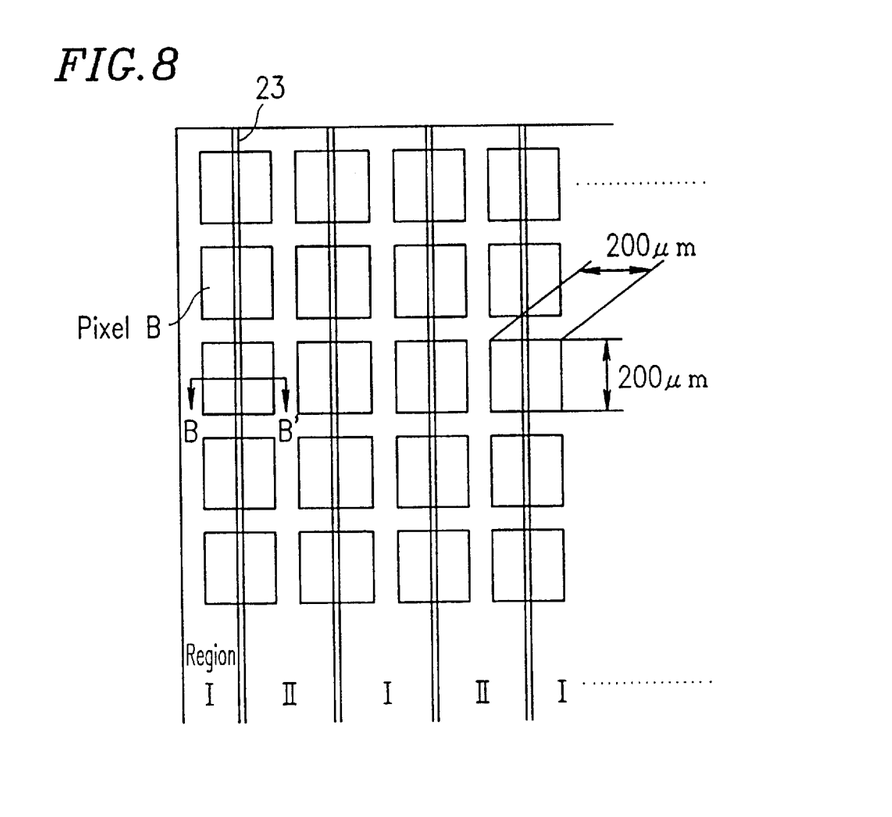
FIG. 8 is a plan view showing a conventional LCD device.
Figure 9:
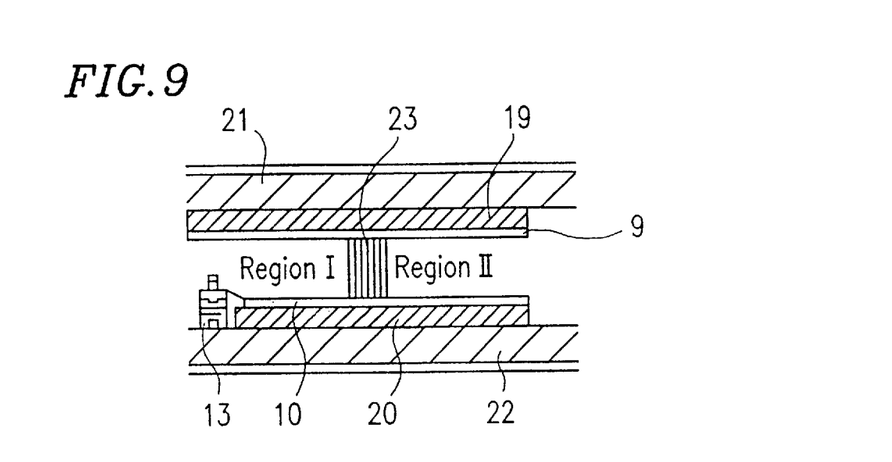
FIG. 9 is a cross-sectional view showing the conventional LCD device taken along line B–B' in FIG. 8.

A conventional LCD device as shown in FIGS. 8 and 9 is known. FIG. 8 is a plan view of the conventional LCD device. FIG. 9 is a cross-sectional view of the LCD device taken along line B–B' in FIG. 8. This conventional LCD device has a plurality of liquid crystal regions each having a different orientation direction of liquid crystal molecules in each pixel region so as to improve the viewing angle characteristics and obtain a high contrast display.

Hereinafter, the configuration of this LCD device will be described in detail. As shown in FIGS. 8 and 9, one of a pair of opposing substrates interposing a liquid crystal layer therebetween includes: a glass plate 22; a transparent electrode 20 for display (hereinafter, referred to simply as a "transparent electrode 20") provided on the glass plate 22 so as to correspond to each pixel region; and a thin-film transistor 13 (hereinafter, referred to as a "TFT") for selectively applying a potential to the transparent electrode 20, which is electrically connected to each of the transparent electrodes 20. The other substrate includes: a glass plate 21; a transparent electrode 19 for display (hereinafter, referred to simply as a "transparent electrode 19") provided on the glass plate 21 so as to face the transparent electrode 20. Alignment layers 9 and 10 made of polyimide or the like for controlling the orientation of liquid crystal molecules are formed on the surfaces of the two substrates. A liquid crystal layer is interposed between the pair of substrates. A pixel region B formed between the opposing transparent electrodes 19 and 20 is, for example, a square having a side of 200 μm. A plurality of the pixel regions B are arranged in a matrix.

Figure 10:
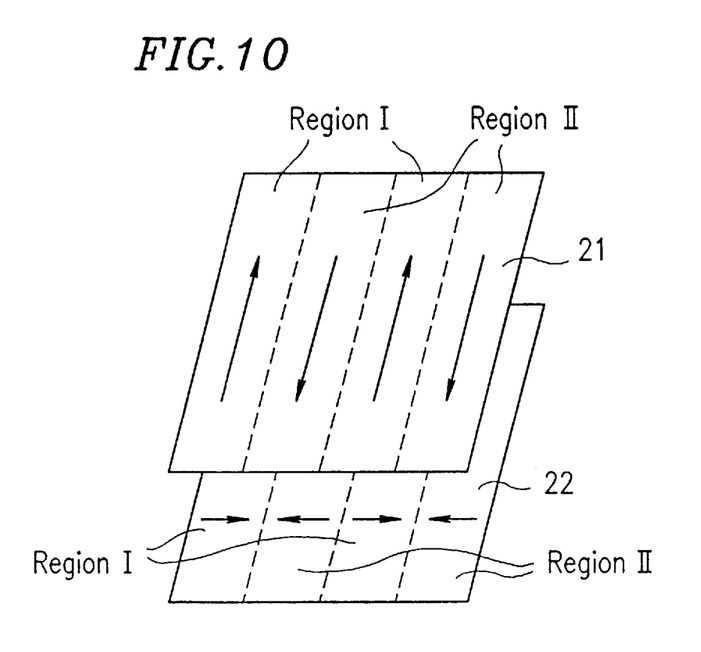
FIG. 10 is a schematic cross-sectional view showing a production step of the conventional LCD device.

Provided on the center of the transparent electrode 20 constituting each pixel region B is a strip-shaped spacer 23 made of polyimide. Each pixel region B is divided into a region I and a region II by the strip-shaped spacer 23. For example, as shown in FIG. 10, the regions I and II are formed by performing a rubbing treatment for the alignment layers included in each of the pair of substrates in directions indicated by the arrows. In the production of the conventional LCD device, during the rubbing treatment of the alignment layers, region II is covered with a resist or the like in order to provide region I with orientation control force and region I is covered with a resist or the like in order to provide region II with orientation control force.

The orientation states of the liquid crystal layer in the divided regions I and II are as follows. The liquid crystal molecules in region I and those in region II are helically twisted in an identical direction. However, the major axes of the liquid crystal molecules in region I and those in region II align in different directions. Since the direction of the major axes of the liquid crystal molecules in region I and the direction of those in region II are different from each other, the liquid crystal molecules in region I and those in region II rise in different directions when a voltage is applied. As a result, in the case where light is incident on the substrate at an angle, optical characteristics in region I and those in region II compensate for each other. Consequently, the viewing angle dependence under the application of a voltage is offset by regions I and II each having a different orientation state. Therefore, optical characteristics having a reduced viewing angle dependence can be obtained. Especially in a gray-scale display, no gray-scale inversion is caused even when the viewing angle is varied, thereby obtaining satisfactory display quality.

As another method for providing each pixel region with a plurality of liquid crystal regions each having a different orientation direction of liquid crystal molecules, Japanese Laid-Open Patent Publication Nos. 7-199193, 7-311383, and 7-333612, for example, disclose a method for forming regions each having a different tilt direction by providing concave and convex portions on the surface of a substrate. According to the method, a pretilt angle of the liquid crystal molecules varies in accordance with a tilt direction of the surface of the substrate so that each region can have a different rising direction of the liquid crystal molecules. As a result, viewing angle characteristics of the LCD device can be improved.

Figure 11:
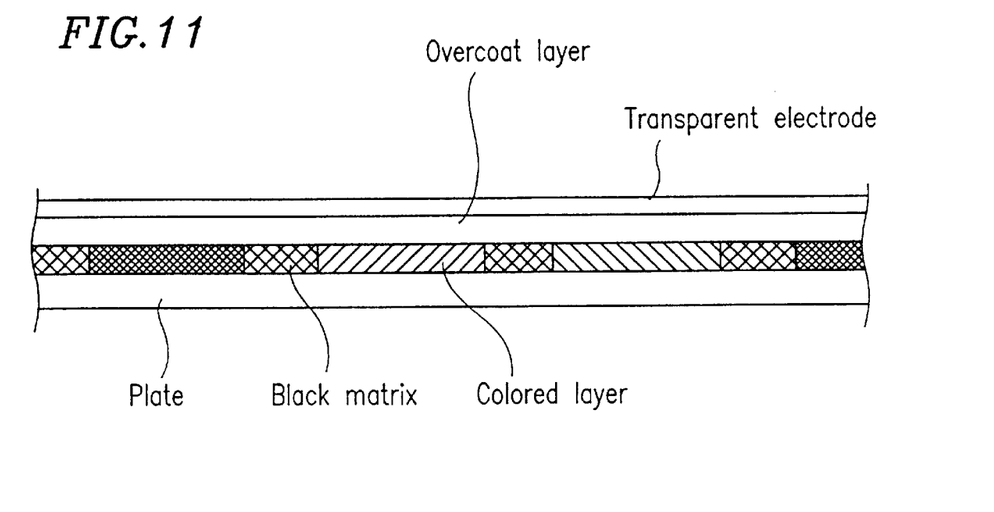
FIG. 11 is a cross-sectional view of a conventional color filter substrate.

In order to realize color display in an LCD device, red, green, and blue colored layers are formed as a color filter on one of a pair of opposing substrates interposing a liquid crystal layer therebetween. Color filters used at present are produced by electrodeposition, a method using a color resist, or the like. The surface of such a color filter in contact with the liquid crystal layer in a display region is generally flattened as shown in FIG. 11.

In order to provide each pixel region with a plurality of liquid crystal regions each having a different liquid crystal molecular orientation so as to obtain wide viewing angle characteristics, a method in which each alignment layer is divided into a plurality of regions and the regions are selectively covered with a resist has been conventionally used as described above. According to this method, however, since a resist, developer, remover and the like are applied to the alignment layers, ions or the like resulting from the application thereof remain on the alignment layers after removal of the resist. In a display state, the residual ions or the like move into the liquid crystal layer. As a result, charge holding characteristics of the liquid crystal material are deteriorated and thus an image persistence or the like occurs. Accordingly, display characteristics are adversely affected. Also, certain kinds of alignment layers lose their orientation control forces due to damage received when they are combined with a resist, developer, remover or the like.

SUMMARY OF THE INVENTION

According to one aspect of this invention, there is a substrate for a liquid crystal display device, which is used as one of a pair of substrates provided so as to face each other with a liquid crystal layer interposed therebetween. The substrate includes a plate, an electrodeposition layer formation electrode, and an electrodeposition layer, provided so that the electrodeposition layer formation electrode is disposed closer to the plate than the electrodeposition layer. The electrodeposition layer formation electrode includes a region having a surface conductivity lower than that of the other region in each pixel region and the low surface conductivity region has a shape of one line or two or more lines. A surface of the electrodeposition layer may include a concave shape having a lowermost portion at a position corresponding to the low surface conductivity region, so that liquid crystal regions each having a different orientation direction of liquid crystal molecules partitioned by the low surface conductivity region are formed.

In one embodiment of the present invention, the low surface conductivity region in the electrodeposition layer formation electrode may be a non-electrode portion or may have a thickness smaller than that of the other region.

In another embodiment of the present invention, the electrodeposition layer may be formed as a colored layer of a color filter.

In still another embodiment of the present invention, an overcoat layer may be provided on the surface of the electrodeposition layer.

In still yet another embodiment of the present invention, a transparent electrode is provided on the surface of the electrodeposition layer.

According to another aspect of this invention, there is a method for fabricating a substrate for a liquid crystal display device, which is used as at least one of a pair of substrates provided so as to face each other with a liquid crystal layer interposed therebetween. The method includes the steps of: forming an electrodeposition layer formation electrode and simultaneously patterning the electrodeposition layer formation electrode so as to form a region having a surface conductivity lower than that of the other region, the low surface conductivity region having a shape of at least one line; forming a black matrix with a window-shaped opening having the same shape as that of a pixel region on the electrodeposition layer formation electrode; and forming an electrodeposition layer on the electrodeposition layer formation electrode by electrodeposition so that a surface of the electrodeposition layer has a concave shape having a lowermost portion at a position corresponding to the low surface conductivity region.

According to still another aspect of this invention, a liquid crystal display device including the substrate according the present invention includes liquid crystal regions each having a different orientation direction of liquid crystal molecules partitioned by the line-shaped low surface conductivity region.

In one embodiment of the present invention, liquid crystal molecules may align in a direction substantially parallel to a surface of the substrate or liquid crystal molecules may align in a direction substantially perpendicular to the surface of the substrate when no voltage is applied to the liquid crystal layer.

According to the present invention, a line-shaped region which has a conductivity lower than that in the other region is provided in each electrodeposition layer formation electrode. When an electrodeposition layer is provided on such an electrode, the surface of the electrodeposition layer has slopes having the lowermost portion above the line-shaped region. Since the orientation of the liquid crystal molecules is controlled in accordance with the sloped surface, liquid crystal regions each having a different orientation direction of the liquid crystal molecules partitioned by the line-shaped region are formed.

The low conductivity region in each electrodeposition layer formation electrode can be formed by providing a non-electrode portion in the electrodeposition layer formation electrode. The low conductivity region can also be formed by making the thickness of the region which is to be a low conductivity region smaller than that of the other region.

The electrodeposition layer can be formed, for example, as a colored layer of a color filter. In this case, since only the patterning of the above-described low conductivity region on each electrode for forming a colored layer of a color filter is required, the production process is not complicated. An overcoat layer may be provided on the colored layer of the color filter. Also, a transparent electrode for applying a voltage to a liquid crystal layer may be provided on the colored layer of the color filter.

The low conductivity region in the electrodeposition layer formation electrode can be simultaneously patterned when the electrodeposition layer formation electrode is patterned so as to correspond to each pixel region. Therefore, the production process is not complicated. By changing the shape of the low conductivity region using a photomask, the surface shape of the electrodeposition layer formed thereon can be easily controlled. A black matrix with window-shaped openings each having the same shape as that of each pixel region is formed on the electrodeposition layer formation electrodes, and the electrodeposition layers are formed thereon. In this manner, the electrodeposition layers having the shape corresponding to the respective pixel regions can be formed. Thus, in the case where the colored layers of the color filters or the like are formed by electrodeposition, a structure in which gaps between the color filters are shielded by the black matrix can be easily made.

When a substrate for an LCD device including such electrodeposition layers is used as at least one of a pair of opposing substrates with a liquid crystal layer interposed therebetween, liquid crystal regions each having a different orientation direction of the liquid crystal molecules partitioned by the line-shaped region are formed in each pixel region. For example, in the case where the liquid crystal molecules are aligned in a direction substantially parallel to the surface of the substrate when no voltage is applied to the liquid crystal layer, a falling direction of the liquid crystal molecules is controlled by the sloped surface of the electrodeposition layer of each pixel region. In the case where the liquid crystal molecules are aligned in a direction substantially perpendicular to the surface of the substrate when no voltage is applied to the liquid crystal layer, a rising direction of the liquid crystal molecules is controlled by the sloped surface of the electrodeposition layer of each pixel region. As a result, each pixel region is divided into a plurality of liquid crystal regions each having a different orientation direction of the liquid crystal molecules.

Thus, the invention described herein makes possible the advantages of: (1) providing a substrate for an LCD device, which can form a plurality of liquid crystal regions each having a different orientation direction of liquid crystal molecules in each pixel region without using a resist; (2) providing a method for fabricating the same; and (3) providing an LCD device using the same.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative, but non-limiting examples with reference to the accompanying drawings.

The term, "a pixel region", referred to in the embodiments is defined as a region which contributes to displaying a respective pixel of the array of pixels constituting an image. Specifically, in the described embodiments, a pixel region is defined as a region corresponding to a pixel electrode included in an active matrix substrate.

(Electrodeposition layer formation electrode)

According to the present invention, an electrodeposition layer formation electrode is provided on at least one of a pair of opposing substrates interposing a liquid crystal layer therebetween. As the electrodeposition layer formation electrode, a transparent conductive film such as an ITO film (a tin-doped indium oxide film) or the like can be used. The transparent conductive film can be formed on a substrate by a conventional method. A plurality of the transparent conductive films which are electrically isolated from each other can be formed into a predetermined shape by etching or the like.

(Low conductivity region in the electrodeposition layer formation electrode)

In the above-described electrodeposition layer formation electrode, a region having a surface conductivity lower than that of the other region is provided for each pixel region.

The low conductivity region can be formed, for example, by providing the electrodeposition layer formation electrode with a portion where no electrode is formed to serve as an insulator. Alternatively, the low conductivity region may be formed by forming a recessed portion by making the thickness of the electrodeposition layer formation electrode smaller than that of the other region so as to sufficiently increase the electrical resistance of the recessed portion. Since such a low conductivity region can be simultaneously patterned when the electrodeposition layer formation electrode is patterned so as to correspond to each pixel region, the production process is not complicated. Also, the shape of the low conductivity region can be easily changed by changing the shape of a photomask used for patterning. By changing the shape of the low conductivity region, the surface shape of an electrodeposition layer formed on the surface of the low conductivity region can be controlled.

Figure 1A:
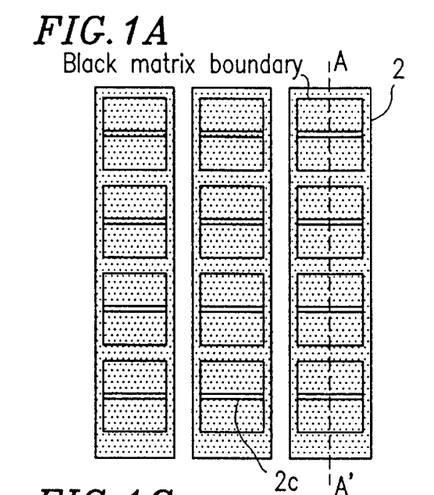
FIGS. 1A to 1E are plan views each showing an exemplary low conductivity region (line-shaped region) of an electrodeposition layer formation electrode in a substrate for an LCD device according to the present invention.
Figure 1B:
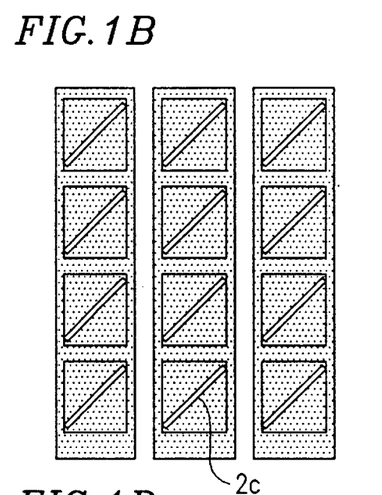
Figure 1C:
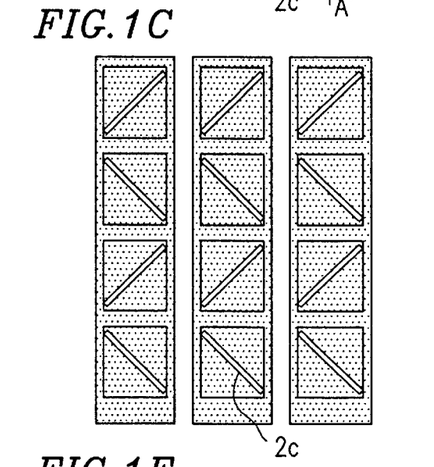
Figure 1D:
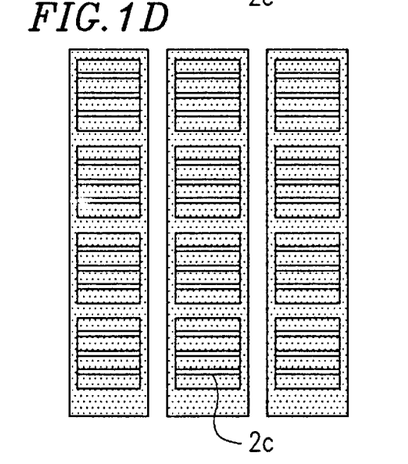
Figure 1E:
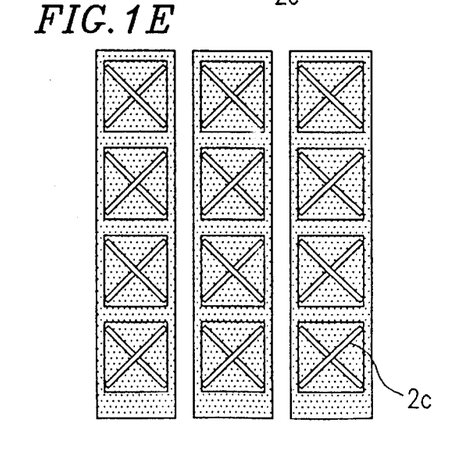

The above-described low conductivity region can be formed into a shape of one line or a combination of two or more lines. Examples of such a shape include: a line-shaped region 2c provided on the center of each pixel region as shown in FIG. 1A; a line-shaped region 2c provided along the diagonal line of each pixel region as shown in FIGS. 1B and 1C; a plurality of line-shaped regions 2c provided in parallel as shown in FIG. 1D; and a plurality of line-shaped regions 2c provided so as to cross each other as shown in FIG. 1E. In these figures, the planar shape of the low conductivity region is a straight line or a combination of two or more straight lines. However, any other shape may be used as long as the orientation direction (or rising and falling directions) of the liquid crystal molecules can be controlled. For example, a shape such as a curve, a rectangle, a wedge or a rhombus can be employed. A shape obtained from a combination thereof may be also used. Although the line width can be set in accordance with the size of an electrodeposition layer (the size of a pixel region) formed by electrodeposition and the thickness of the electrodeposition layer, the maximum width is preferably in the range of about 5 $\mu$m to about 30 $\mu$m.

(Electrodeposition of the electrodeposition layer)

The substrate including the above-described electrodeposition layer formation electrode is immersed into an electrodeposition solution together with a counter electrode (not shown) for forming an electrodeposition layer to perform electrodeposition. In this manner, the electrodeposition layer is formed on the surface of the electrodeposition layer formation electrode.

The counter electrode for forming an electrodeposition layer is not specifically limited as long as it is a conductor which does not react with an electrodeposition solution. For example, a plate-shaped conductor made of stainless steel can be used. The conductor may have a plate shape. However, a net-shaped conductor is more preferable so as to further improve the thickness distribution and smoothness of the electrodeposition film. The shape of the counter electrode may be completely different from that of the substrate. Preferably, however, the counter electrode has the same shape as or a similar shape as the substrate.

The electrodeposition of the electrodeposition layer can be performed by a known method. The electrodeposition includes anion type electrodeposition and cation type electrodeposition. Although both methods can be employed in the present invention, the anion type electrodeposition is preferred because it influences a circuit less than the cation type electrodeposition.

Generally, an electrodeposition solution is prepared by: dispersing or dissolving components such as a resin material (a binder) and a colorant into an appropriate solvent, or diluting these components with an appropriate solvent. As a binder, resins such as a maleic oil resin, an acrylic resin, a polyester resin, a polybutadiene resin, and a polyolefine resin can be used. Each of these materials can be used alone or in combination. A thermosetting resin or a photocurable resin can also be used as the binder. In the case where a colored layer of a color filter is formed as the electrodeposition layer, a colorant of a desired hue such as a dye or a pigment is mixed into the binders. As a solvent, water, an organic solvent, or the like can be used.

An electrodeposition solution bath is not particularly limited as long as it is made of an insulating material capable of holding an electrodeposition solution. For example, a plastic electrodeposition solution bath made of rigid vinyl chloride, an acrylic resin, or the like can be used.

The above-mentioned electrodeposition solution is put into such an electrodeposition solution bath. Then, the substrate and the counter electrode for forming an electrodeposition layer are placed in parallel in the electrodeposition solution so as to face each other. At this time, it is preferred that the substrate and the counter electrode are disposed so that the center of the substrate corresponds to the center of the counter electrode.

In the case where the anion type electrodeposition is performed, the above-described electrodeposition layer formation electrode serves as an anode and the counter electrode for forming an electrodeposition layer serves as a cathode. When a DC voltage is applied across the anode and the cathode, the electrodeposition layer is formed on the surface of the electrodeposition layer formation electrode.

An electrodeposition layer is hardly formed on the low conductivity region on the surface of the electrodeposition layer formation electrode. However, depending on a width of the line shape and processing conditions of the electrodeposition, an electrodeposition layer may form on the low conductivity region. As a result, the surface of the electrodeposition layer has slopes with the lowermost portion at the position corresponding to the low conductivity region. In the case where a substrate having such a sloped surface is used as at least one of the pair of the opposing substrates interposing the liquid crystal layer therebetween, the orientation direction of the liquid crystal molecules is controlled in accordance with the sloped surface. As a result, a plurality of liquid crystal regions each having a different orientation direction of the liquid crystal molecules are formed.

The control of such a sloped surface is very advantageous in terms of the production process because such a control can be performed just by changing a photomask for forming the low conductivity region in the electrodeposition layer formation electrode. The sloped surface needs to be formed in a pixel region serving for display, but slopes are not required in a wiring portion which does not serve for display, a portion covered with a black matrix described later, or the like.

The electrodeposition layer can be formed, for example, as a colored layer of a color filter. In this case, the low conductivity region can be formed in an electrode for electrodeposition, which serves to form the colored layer of the color filter. Therefore, a plurality of liquid crystal regions each having a different orientation direction of the liquid crystal molecules can be easily formed in each pixel region without complicating the production process.

(Material for plate)

According to the present invention, the material for the plate is not specifically limited. Examples of such a material include a transparent plate such as a glass plate and a plastic plate. Also, the pair of plates may be formed of different materials.

(Black matrix)

The planar shape of the colored layer of the color filter is preferably a window shape which corresponds to each pixel region. In order to form windowshaped colored layers by electrodeposition, a method of forming a black matrix having an opening at a position above each electrodeposition layer formation electrode is well known. For example, a film made of a photosensitive resin is formed on the entire surface of the substrate including the electrodeposition layer formation electrodes. The film is then exposed to light and developed using a photomask having a desired pattern. As a result, a black matrix having window-shaped openings is formed, so that the surfaces of the electrodeposition layer formation electrodes are exposed through the openings.

As a material for such a black matrix, a photosensitive material having a heat resistance and a solvent resistance (e.g., an acrylic resin, a polyester resin, and a polyimide resin) with a light-shielding pigment (e.g., carbon black and titanium black) dispersed therein can be used. In the present invention, however, the material forming the black matrix is not limited to a specific material. Any known material can be used as long as the material has the light-shielding property and other specific properties. For example, a commercially available photosensitive resin containing a black material (e.g., CFPR-BK550S, manufactured by Fuji-Hunt Electronics Technology Co., Ltd.; B259-BKO, manufactured by Nippon Steel Chemical Co., Ltd.) can be used.

As a method for forming the light-shielding film, a conventional method such as screen printing, spin coating or roll coating can be employed. The thickness of the light-shielding film is adjusted so that the resultant black matrix has a desired thickness.

The black matrix is patterned into a shape as shown in FIGS. 1A through 1E so as to form window-shaped openings through which the electrodeposition layer formation electrodes 2 are exposed. As a result, the electrodeposition layers are formed on the exposed surfaces of the electrodeposition layer formation electrodes 2. For example, in the case where the colored layers of the color filters are formed as the electrodeposition layers, gaps between the color filters can be easily covered with the black matrix.

(Overcoat layer)

In the case where the colored layer of the color filter is formed as the electrodeposition layer, an overcoat layer is provided on the surface of the colored layer.

In order to improve the adhesion between the electrodeposition layer and the transparent electrode formed thereon, or in order to flatten the roughness of the surface (roughness of electrodeposition colorant) so as to produce the sloped shape according to the present invention, formation of the overcoat layer is preferred. As a material for the overcoat layer, a polymer having an excellent transparency and heat resistance (e.g., epoxy acrylates such as V-259PA or other acrylates) can be used.

(Transparent electrode)

In the case where the colored layer of the color filter is formed as the electrodeposition layer, a transparent electrode can be formed thereon as an electrode for driving the liquid crystal layer. A transparent conductive film such as an ITO film, for example, can be used as the transparent electrode, which can be produced on the substrate by a conventional method.

(LCD device)

In the case where the above-described substrate for an LCD device, which has the electrodeposition layer with the sloped surface, is used as at least one of the pair of the opposing substrates interposing the liquid crystal layer therebetween, the liquid crystal molecules align in accordance with the sloped surface of the electrodeposition layer. As a result, a plurality of liquid crystal regions each having a different orientation direction of the liquid crystal molecules are formed in the liquid crystal layer, thereby improving the viewing angle characteristics of the LCD device.

Two specific embodiments of the invention will now be described.

According to Case 1, an initial orientation of the liquid crystal molecules is parallel to the substrate.

In the case where the liquid crystal molecules are aligned in a direction substantially parallel to the substrate when no voltage is applied to the liquid crystal layer, the rising direction of the liquid crystal molecules under the application of a voltage is controlled by the sloped surface of the electrodeposition layer.

Figure 2:
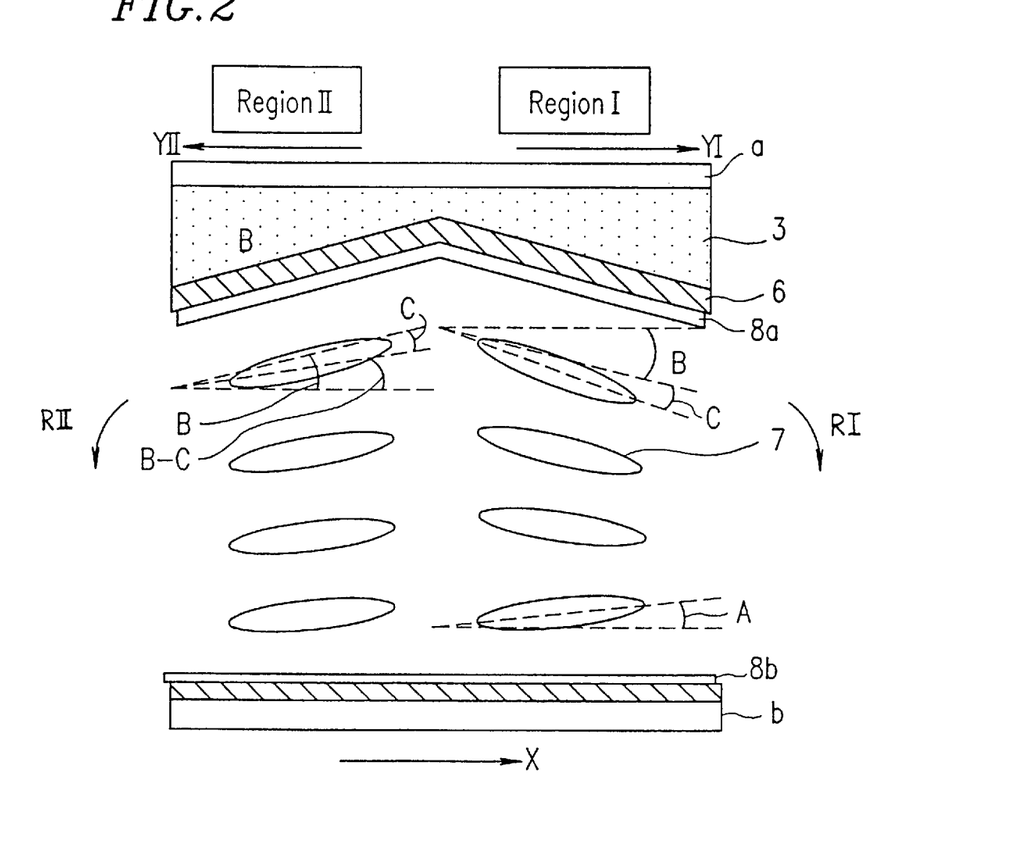
FIG. 2 is a schematic cross-sectional view showing an orientation state of liquid crystal molecules in the case where an initial orientation of the liquid crystal molecules is parallel to a substrate in an LCD device of the present invention.

For example, as shown in FIG. 2, provided over a plate b disposed so as to face a plate a with the liquid crystal layer interposed therebetween is an alignment layer $8b$ having liquid crystal orientation control force to provide liquid crystal molecules 7 with the pretilt angle of A with respect to the surface of the plate b. The pretilt direction of the liquid crystal molecule 7 with respect to the plate b is indicated by arrow X. On the other hand, provided over the plate a is an electrodeposition layer 3 with a cross-sectional shape whose thickness is smallest at the center of each pixel region and gradually increases towards its edges. The tilt angle of the electrodeposition layer 3 is angle B with respect to the plate a. Provided over the electrodeposition layer 3 is an alignment layer $8a$ having liquid crystal orientation control force to allow the liquid crystal molecules 7 to tilt by angle C with respect to the sloped surface of the electrodeposition layer 3. As a result, the pretilt angle (i.e. the angle with respect to the plate a) is: B+C in a region I; and B−C in a region II. The pretilt directions in regions I and II with respect to the plate a are indicated by arrows YI and YII, respectively. In this case, the pretilt directions YI and YII are opposite to each other.

In the case where a voltage is applied to the liquid crystal layer, if the pretilt angle A is smaller than the pretilt angles B+C and B−C, the liquid crystal molecules 7 in region I and those in region II rotate in the directions opposite to each other as indicated by arrows RI and RII. As a result, regions I and II each having a different orientation direction of the liquid crystal molecules 7 are generated in each pixel region. Specifically, the orientation directions in regions I and II are generally symmetrical with respect to the center of the pixel region, i.e. with respect to the smallest thickness area of the electrodeposition layer 3. The viewing angle characteristics of region I and that of region II compensate for each other in each pixel region even when a viewing angle is changed. Therefore, wide viewing angle characteristics can be obtained.

According to Case 2, an initial orientation of the liquid crystal molecules is perpendicular to the substrate.

In the case where the liquid crystal molecules are aligned in a direction substantially perpendicular to the substrate when no voltage is applied to the liquid crystal layer, the falling direction of the liquid crystal molecules under the application of a voltage is controlled by the sloped surface of the electrodeposition layer.

Figure 3A:
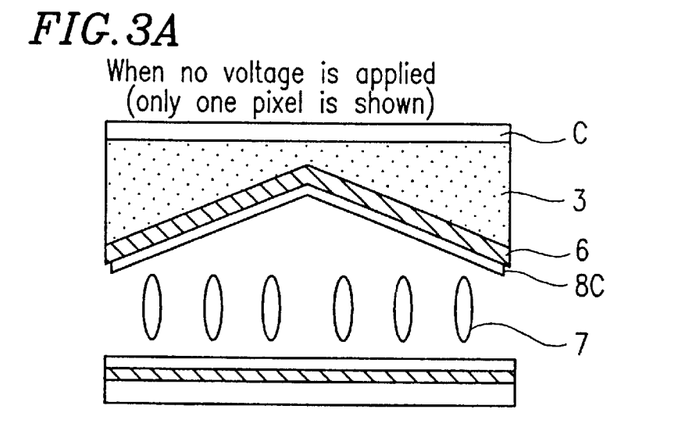
FIGS. 3A to 3C are schematic cross-sectional views showing orientation states of the liquid crystal molecules in the case where an initial orientation of the liquid crystal molecules is perpendicular to the substrate in the LCD device of the present invention.
Figure 3B:
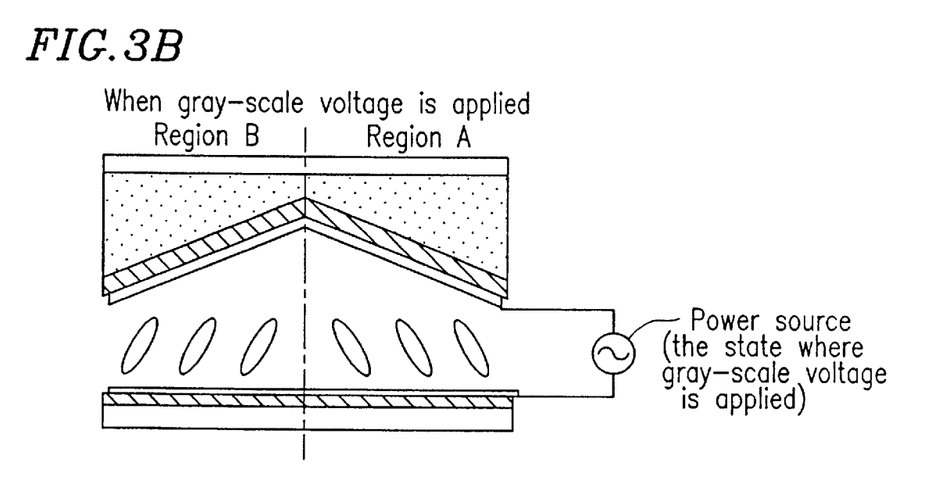
Figure 3C:
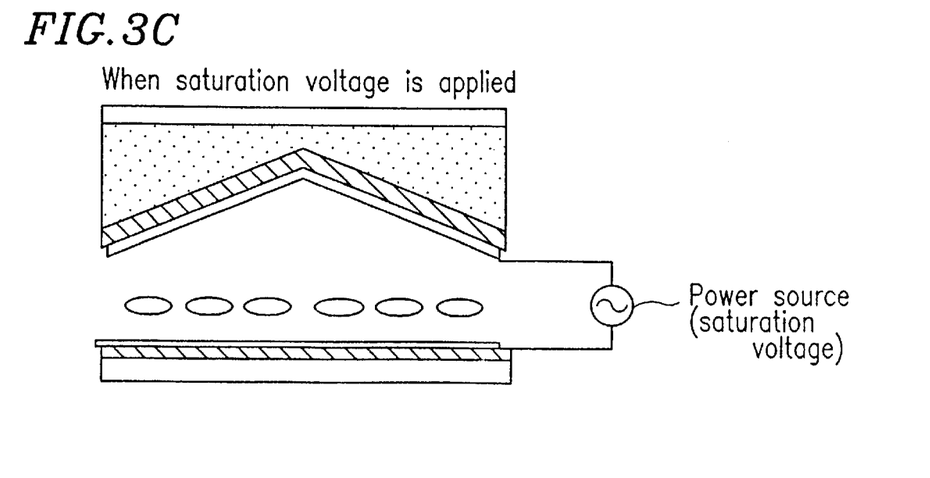

For example, as shown in FIGS. 3A to 3C, provided on a plate c facing another plate with the liquid crystal layer interposed therebetween is the electrodeposition layer 3 with a cross-sectional shape whose thickness is smallest at its center and gradually increases thickness towards its edges. The tilt angle of the electrodeposition layer 3 is angle B. As shown in FIG. 3A, when no voltage is applied to the liquid crystal layer, the liquid crystal molecules 7 align in a direction substantially perpendicular to the plate c. As shown in FIG. 3C, in the case where a saturation voltage is applied to the liquid crystal layer, the liquid crystal molecules 7 align in a direction substantially parallel to the plate c. On the other hand, as shown in FIG. 3B, in the case where a gray-scale voltage is applied to the liquid crystal layer, the liquid crystal molecules 7 fall in accordance with the sloped surface of the electrodeposition layer 3. As a result, the liquid crystal molecules 7 in a region A and those in a region B fall in opposite directions from each other. Consequently, the regions A and B each having a different orientation direction of the liquid crystal molecules 7 are generated in each pixel region. Since the viewing angle characteristics in the region A and those in the region B compensate for each other in each pixel region when a viewer watches the display at an angle, wide viewing angle characteristics can be obtained.

As shown in Cases 1 and 2, it is apparent that regions each having a different orientation direction of the liquid crystal molecules are formed not only in the case where the direction of the maximum slope angle at the sloped surface of the electrodeposition layer and the direction of the orientation control force (i.e. the rubbing direction) of the alignment layer are identical with each other, but also are formed in the case where the two directions differ from each other.

Sloping directions of such a sloped surface is not limited to two directions. A sloped surface having three or more sloping directions may be formed in each pixel region. In the case where an initial orientation of the liquid crystal molecules is perpendicular with respect to the substrate as in an electrically controlled birefringence (ECB) type liquid crystal display mode and the like, maximum light transmittance can be obtained when the liquid crystal molecules fall along the polarization axis of a polarizer. Therefore, it is preferable that a sloped surface having two or four sloping directions is formed in each pixel region so that the direction of the maximum slope angle of the sloped surface is identical with the direction of the polarization axis. An electrodeposition layer having a sloped surface of four sloping directions can be formed by forming crossshaped low conductivity regions in the electrodeposition layer formation electrode for each pixel region.

Hereinafter, examples of the present invention will be described in more detail. However, the present invention is not limited to the following examples.

(EXAMPLE 1)

In Example 1, a color filter substrate is fabricated as a substrate for an LCD device according to the present invention.

Figure 4A:
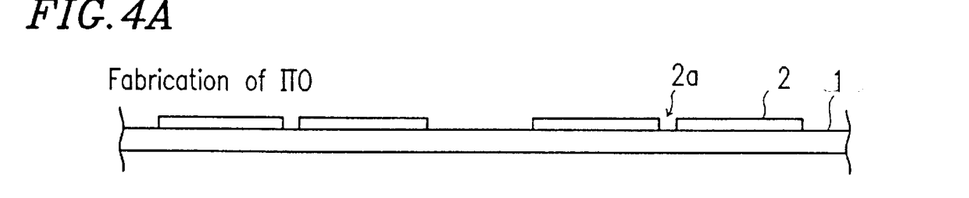
FIGS. 4A to 4E are schematic cross-sectional views showing production steps of a color filter substrate of Example 1 according to the present invention.

First, as shown in FIG. 4A, an electrodeposition layer formation electrode 2 (hereinafter, simply referred to as an "electrode 2") is formed on the surface of a glass plate 1 using an ITO. When the electrodes 2 are patterned so as to correspond to each pixel region, a line-shaped non-electrode portion $2a$ with a width of 15 μm having a planar shape as shown in FIG. 1A and a cross-sectional shape as shown in FIG. 4A is formed at the center of the electrode 2 which also will be the center of each pixel region.

Figure 4B:
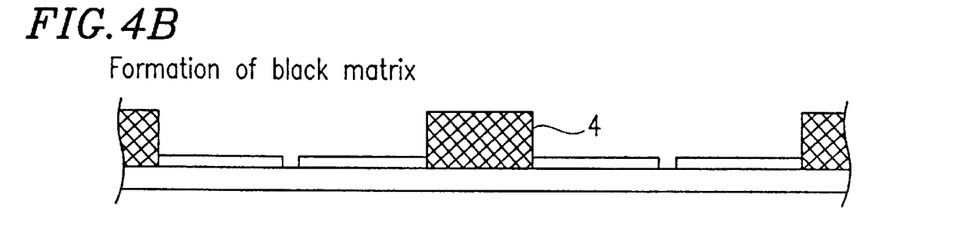

Next, as shown in FIG. 4B, a black matrix 4 having window-shaped openings each corresponding to a pixel region is formed by applying a negative type resist in which a black pigment is dispersed (V259-BKO, manufactured by Nippon Steel Chemical Co., Ltd.), patterning the resist by conventional photolithography, and baking and curing the patterned resist.

Figure 4C:
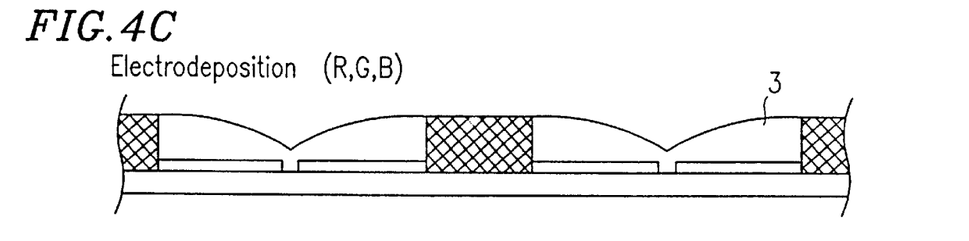

Subsequently pigments of red, green and blue are dispersed in anionic polyester resin type paint for electrodeposition by a known method so as to prepare red, green and blue electrodeposition solutions, respectively. The above-described substrate is placed within each of the red, green, and blue electrodeposition solutions together with a counter electrode so as to perform electrodeposition. After the substrate is removed from each electrodeposition solution, the substrate is sufficiently washed with water. Then, the substrate is subjected to baking and curing to form the red, green, and blue electrodeposition layers 3. As shown in FIG. 4C, the resultant electrodeposition layers 3 are precisely formed only in the openings of the black matrix 4. The surface thereof has two sloped portions having the lowermost portion above the line-shaped non-electrode portion 2a.

Figure 4D:
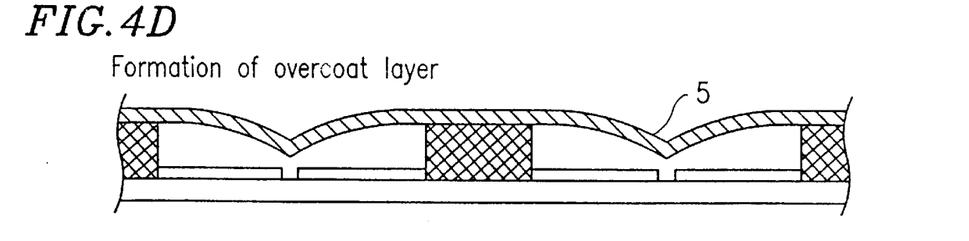
Figure 4E:
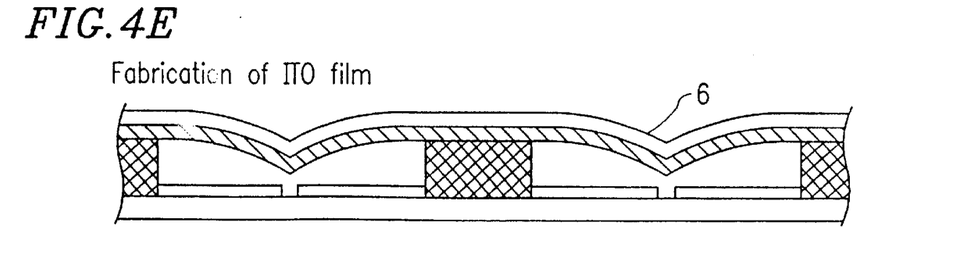

Next, an overcoat layer 5 is formed as shown in FIG. 4D, and a transparent electrode 6 for display, which is made of an ITO film, is formed on the overcoat layer 5 as shown in FIG. 4E. Thus, the color filter substrate was fabricated.

(Comparative Example 1)

In Comparative Example 1, the line-shaped non-electrode portion 2a is not provided in each electrode 2 using a photomask different from that used at the patterning of the electrode 2 in Example 1.

A color filter substrate is fabricated in the same manner as that in Example 1 except that the photomask is different. The thus fabricated color filter substrate has a flat surface as in the conventional color filter substrate shown in FIG. 11.

(Reference Example 1)

In Reference Example 1, a line-shaped non-electrode portion 2a with a width of 30 μm or more is formed in each electrode 2 using a photomask different from that used at the patterning of the electrode 2 in Example 1.

A color filter substrate is fabricated in the same manner as that in Example 1 except that the photomask is different. The line-shaped non-electrode portion 2a in the electrode 2 is not sufficiently covered with the electrodeposition layer 3. As a result, light passes through at this point and the color purity is reduced at the portion 2a.

(Reference Example 2)

In Reference Example 2, a line-shaped non-electrode portion 2a having a width of 5 μm or less is provided using a photomask different from that used for patterning the electrode 2 in Example 1.

A color filter substrate is fabricated in the same manner as that in Example 1 except that the photomask is different. The concave portion at the center of the electrodeposition layer 3 of each pixel region is insufficiently small and the slope angle of the surface of the electrodeposition layer 3 is also insufficiently small.

(EXAMPLE 2)

Figure 5:
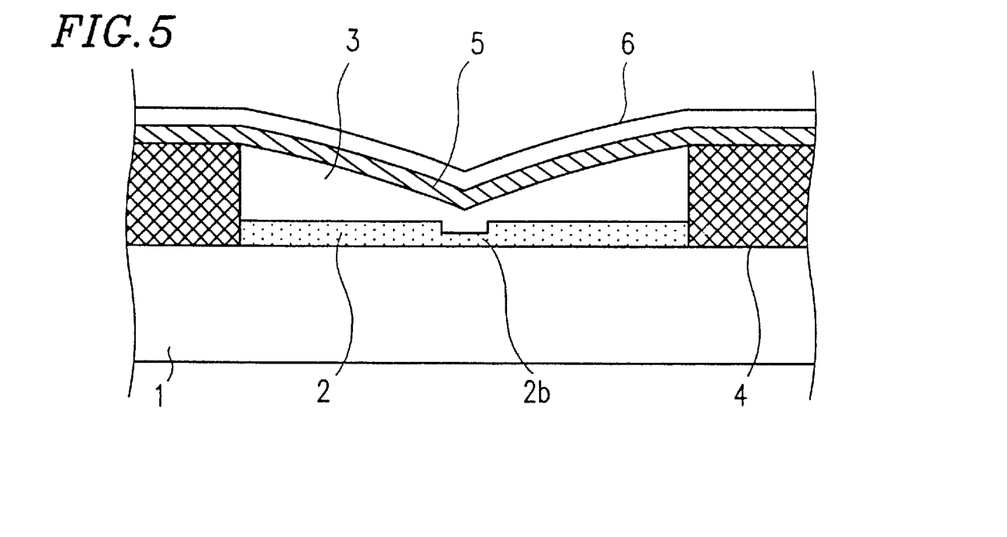
FIG. 5 is a cross-sectional view showing a color filter substrate of Example 2 according to the present invention.

In Example 2, the electrode 2 is patterned using the same photomask as in Comparative Example 1. Then, as shown in FIG. 5, each electrode 2 is etched to form a line-shaped region 2b having a thickness of about ⅓ of that of the other region, using a resist mask formed by photolithography so as to have openings with a maximum width of 30 μm so as.

In Example 2, the color filter substrate is fabricated in the same manner as that in Example 1 except for the above-described point. Although the thin line-shaped region 2b has a large width (a width of 30 μm), the thin region 2b is covered with the electrodeposition layer 3. As a result, neither light passing through nor reduction of the color purity is observed. The reason for this is considered to be that low conductivity is maintained by the electrode 2 in the region 2b.

(EXAMPLE 3)

Figure 6:
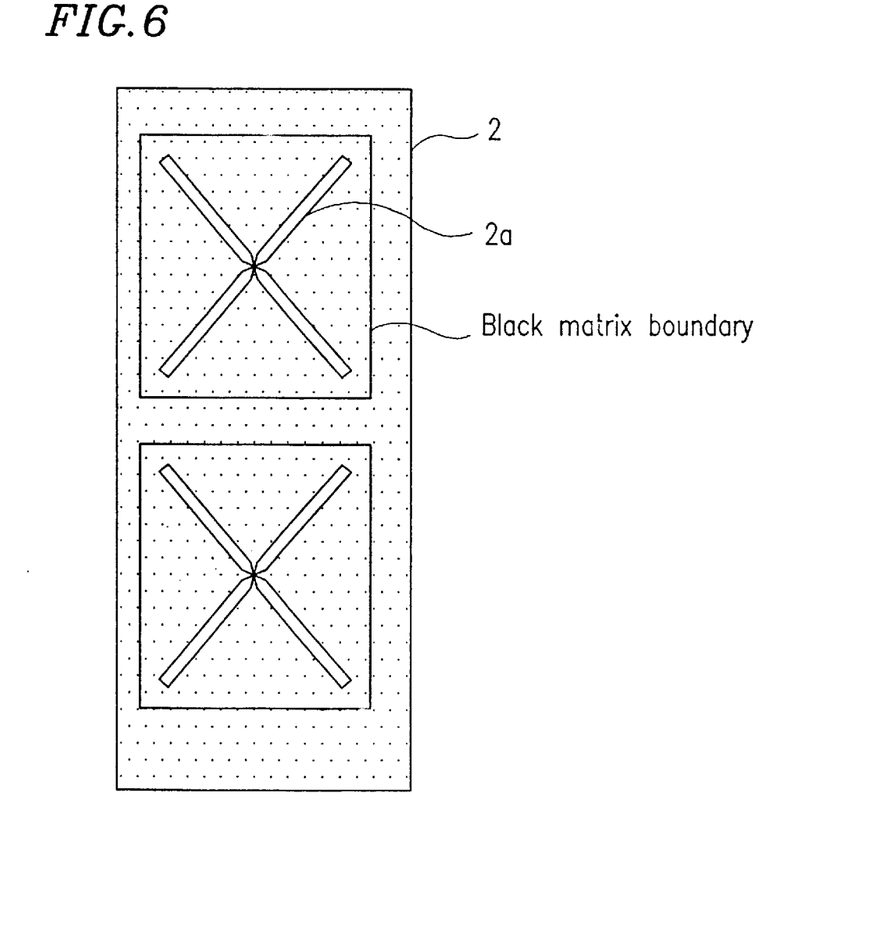
FIG. 6 is a plan view showing a line-shaped region of an electrodeposition layer formation electrode in a color filter substrate of Example 3 according to the present invention.

In Example 3, non-electrode portions 2a are formed in each electrode 2 so as to have a cross shape as shown in FIG. 6. Since the amount of electrodeposition excessively drops at the crossing, however, the electrode 2 is unetched at the crossing.

In Example 3, the color filter substrate is fabricated in the same manner as that in Example 1 except for the above-described point. The surface thereof has four sloped portions having the lowermost portions above the line-shaped non-electrode portions 2a.

(EXAMPLE 4)

Figure 7:
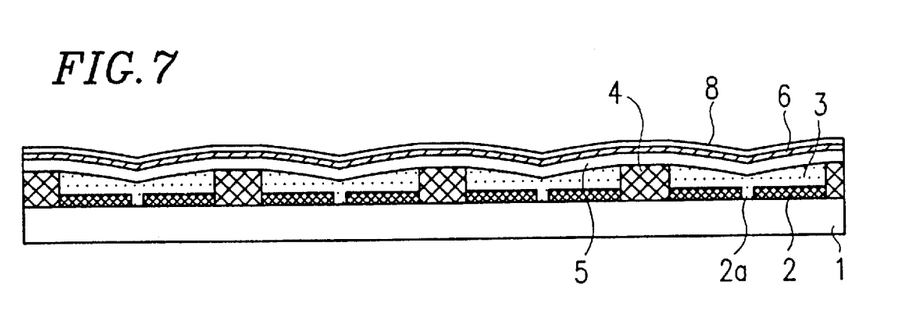
FIG. 7 is a cross-sectional view showing the color filter substrate of Example 1, taken along a line corresponding to line A–A' in FIG. 1A.

In Example 4, as shown in FIG. 7, a horizontal alignment layer 8 (AL4552: manufactured by JAPAN SYNTHETIC RUBBER Co., Ltd.) is formed on the surface of the color filter substrate of Example 1 or the color filter substrate of Example 2. Then, the alignment layer is rubbed with a nylon cloth in a direction of the maximum slope on the surface of the color filter substrate. Also, a substrate including TFTs and transparent electrodes for display arranged in a matrix (hereinafter, referred to as a "TFT substrate") is fabricated by a conventional method. The horizontal alignment layer 8 (AL4552: JAPAN SYNTHETIC RUBBER Co., Ltd.) is formed thereon, and rubbed with a nylon cloth. A sealing material is provided on the region other than the display region of the TFT substrate. Then, the TFT substrate and the color filter substrate are attached to each other. P-type liquid crystal material (ZLI4792: manufactured by Merck & Co., Inc.) is injected into a gap between the two substrates. After the temperature is raised to a temperature where the liquid crystal material indicates isotropic phase, the temperature is gradually lowered. In this manner, the LCD device of Example 4 is completed.

In the thus obtained LCD device of Example 4, liquid crystal regions each having a different orientation direction of liquid crystal molecules are formed in each pixel region. As a result, the LCD device has a wide viewing angle.

(Comparative Example 2)

In Comparative Example 2, an LCD device is fabricated in the same manner as that in Example 4 except that the color filter substrate of Comparative Example 1 is utilized.

In the LCD device of Comparative Example 2, the liquid crystal molecules have one identical orientation direction in each pixel region, and thus no liquid crystal regions each having a different orientation direction are formed. Also, a phenomenon such as gray-scale inversion occurs when the viewing angle is changed.

(EXAMPLE 5)

In Example 5, a vertical alignment layer (JALS204: manufactured by JAPAN SYNTHETIC RUBBER Co., Ltd.) is formed on the surface of each of the color filter substrate of Example 3 and the TFT substrate of Example 4. Then, without performing a rubbing treatment, the TFT substrate and the color filter substrate are attached to each other. N-type liquid crystal material (ZLI4788-000: manufactured by Merck & Co., Inc.) is injected into a space between the two substrates. The temperature is raised to a temperature where the liquid crystal material indicates isotropic phase, and then gradually lowered. In this manner, the LCD device of Example 5 is fabricated.

In the thus obtained LCD device of Example 5, liquid crystal regions each having a different orientation direction of the liquid crystal molecules are formed in each pixel region. Accordingly, the LCD device of Example 5 has a wide viewing angle.

As is apparent from the above, according to the present invention, the slope of the surface of the electrodeposition layer formed on the substrate for an LCD device and the lowermost position thereof can be controlled. This ensures the control of the arrangement of the plurality of liquid crystal regions each having a different orientation direction of the liquid crystal molecules formed in each pixel region. Accordingly, an LCD device with wide viewing angle characteristics exhibiting uniform and high-contrast display can be realized.

According to the present invention, a surface shape of the electrodeposition layer can be easily controlled by a photomask used for patterning or etching the electrodeposition layer formation electrode. As a result, an LCD device having excellent display characteristics can be produced at low cost. Since a resist or the like does not need to be formed on the alignment layer in order to form a plurality of liquid crystal regions each having a different orientation direction of the liquid crystal molecules, the display characteristics thereof are not adversely affected by an otherwise formed resist or the like.

According to the present invention, the above-described electrodeposition layer can be formed as a colored layer of a color filter. The electrodeposition layer can be easily formed by forming a low conductivity region on the surface of the electrodeposition layer formation electrode. Therefore, without complicating the production process, an LCD device having excellent display characteristics can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A substrate for a liquid crystal display device, which is used as one of a pair of substrates provided so as to face each other with a liquid crystal layer interposed therebetween, the substrate comprising:

a plate;

an electrodeposition layer formation electrode, and an electrodeposition layer provided so that the electrodeposition layer formation electrode is disposed closer to the plate than the electrodeposition layer, wherein the electrodeposition layer formation electrode includes a region having a surface conductivity lower than that of the other region in each pixel region and the low surface conductivity region has a shape of at least one line, and wherein a surface of the electrodeposition layer has a concave shape having a lowermost portion at a position corresponding to the low surface conductivity region, so that liquid crystal regions each having a different orientation direction of liquid crystal molecules partitioned by the low surface conductivity region are formed.

2. A substrate for a liquid crystal display device according to claim 1, wherein the low surface conductivity region of the electrodeposition layer formation electrode is a non-electrode portion.

3. A substrate for a liquid crystal display device according to claim 1, wherein a thickness of the low surface conductivity region of the electrodeposition layer formation electrode is smaller than that of the other region.

4. A substrate for a liquid crystal display device according to claim 1, wherein the electrodeposition layer is formed as a colored layer of a color filter.

5. A substrate for a liquid crystal display device according to claim 4, wherein an overcoat layer is provided on the surface of the electrodeposition layer.

6. A substrate for a liquid crystal display device according to claim 4, wherein a transparent electrode is provided on the surface of the electrodeposition layer.

7. A method for fabricating a substrate for a liquid crystal display device, which is used as at least one of a pair of substrates provided so as to face each other with a liquid crystal layer interposed therebetween, the method comprising the steps of:

forming an electrodeposition layer formation electrode and simultaneously patterning the electrodeposition layer formation electrode so as to form a region having a surface conductivity lower than that of the other region, the low surface conductivity region having a shape of at least one line;

forming a black matrix with a window-shaped opening having the same shape as that of a pixel region on the electrodeposition layer formation electrode; and forming an electrodeposition layer on the electrodeposition layer formation electrode by electrodeposition so that a surface of the electrodeposition layer has a concave shape having a lowermost portion at a position corresponding to the low surface conductivity region.

8. A liquid crystal display device including the substrate according to claim 1, comprising liquid crystal regions each having a different orientation direction of liquid crystal molecules partitioned by the line-shaped low surface conductivity region.

9. A liquid crystal display device according to claim 8, wherein liquid crystal molecules align in a direction substantially parallel to a surface of the substrate when no voltage is applied to the liquid crystal layer.

10. A liquid crystal display device according to claim 8, wherein liquid crystal molecules align in a direction substantially perpendicular to the surface of the substrate when no voltage is applied to the liquid crystal layer.

* * * * *